United States Patent [19]

Nelson et al.

[11] Patent Number: 4,617,689

[45] Date of Patent: Oct. 21, 1986

[54] BED FRAME AND RELEASABLE COUPLING EMPLOYED THEREIN

[75] Inventors: Maynard A. Nelson, Bethel, Vt.; Kelly C. Gloger, Meriden, N.H.

[73] Assignee: GN Alternatives, Bethel, Vt.

[21] Appl. No.: 667,302

[22] Filed: Nov. 1, 1984

[51] Int. Cl.⁴ .................... A47C 19/00; A47C 19/22; B25G 3/18
[52] U.S. Cl. .................... 5/400; 5/201; 5/200 C; 5/297; 5/282 R; 5/308; 403/330; 403/252
[58] Field of Search .................. 5/200 R, 200 C, 201, 5/238, 282 R, 282 B, 285, 290, 291, 293, 297, 298, 308, 400; 403/330, 252, 254; 312/111; 292/247

[56] References Cited

U.S. PATENT DOCUMENTS

| 1,444,950 | 2/1923 | Cook | 5/297 |
| 3,479,701 | 11/1969 | Zerfoss | 403/330 |
| 3,841,726 | 10/1974 | Andros et al. | 312/111 |
| 4,507,815 | 4/1985 | Danko | 5/400 |

FOREIGN PATENT DOCUMENTS 821396 11/1951 Fed. Rep. of Germany .......... 5/297

153699 11/1920 United Kingdom .................... 5/308

Primary Examiner—Thomas J. Holko
Assistant Examiner—Michael F. Trettel
Attorney, Agent, or Firm—Sughrue, Mion, Zinn, Macpeak, and Seas

[57] ABSTRACT

A knockdown platform or storage bed employs single or double rows of U-shaped channel members to join laterally opposed sideboards, through a detachable coupling at opposed ends of the channel members, to receivers fixed to the inside of the sideboards at longitudinally spaced positions and at both ends. The channel members are provided with C-shaped slots to each side slidably receiving insertable panels to form with the channel members a planar mattress support. The sideboards act in conjunction with endboards to define via a sideboard ladder frame and through other U-shaped channel members, a support system for drawers slidably insertable through the open ladder frame, to create a storage bed. The panels are sized to the slidably insertable drawers to function as covers, overlying the drawers when the drawers are removed. The couplings include pivotable, overcenter latches mounted to the interior of the U-shaped channel members at their ends.

9 Claims, 10 Drawing Figures

BED FRAME AND RELEASABLE COUPLING EMPLOYED THEREIN

BACKGROUND OF THE INVENTION

Low, rectangular platform type beds have come into vogue over the last few years, in which the bed frame constitutes a boxlike assembly having a planar solid upper surface upon which a box spring and overlying mattress rest. Such beds may include conventional raised headboards and footboards at opposite ends of the bed. Additionally, such bed structures may include slidable drawers which slide into the bed frame and under the parts supporting the box spring and mattress to permit storage of clothing and the like within the slidable drawers.

It is a primary object of the present invention to provide such platform or storage bed which is of knockdown form and which involves the utilization of latch type couplings for latching the components into a rather rigid assembly capable of supporting induced loads; which incorporates an improved system for supporting a plurality of slidable drawers to each side of the bed longitudinal center line; which permits the platform or storage bed to be set up or disassembled in a matter of minutes, which is of low cost, and which has good eye appeal.

It is a further object of the present invention to provide aan improved overcenter latch coupling for detachably clamping a channel member at its end to an abutting supporting member and which creates a highly rigid coupling between the channel member and that confronting support member.

SUMMARY OF THE INVENTION

The invention in part is directed to a knockdown bed which comprises opposed, longitudinally separated end boards, laterally opposed side boards, and a plurality of U-shaped channel members of a length approximately the length of the end boards for connection of the opposed end boards and side boards in a rigid, rectangular frame assembly. Each of the U-shaped channel members mounts an overcenter latch assembly at opposite ends of each channel member for detachable coupling the channel member ends to receiver assemblies fixedly mounted to and at longitudinally spaced positions along at least the top of the bed opposed sideboards to form at least one upper or top row of said receivers. A channel member is fixed to one side to respective facing sides of the bed end boards, at a height corresponding to the position of the receiver assemblies on the side boards. The channel members include laterally projecting flanges on each side thereof defining C-shaped slots to each side thereof. Thin, rectangular, hollow core panels are slidably inserted within the facing C-shaped slots of adjacent channel members to form a planar box spring and mattress support across the top of the bed longitudinally from one end board to the other and, laterally, from one side board to the other.

The U-shaped channel members coupled to respective ones of the at least one top row of receiver assemblies may be inverted with their open ends facing downwardly and with the channel member bottoms nearly flush with the panels. The side boards each may comprise an open ladder frame of rectangular configuration including vertical risers joining top and bottom board members, defining rectangular openings therein. The U-shaped channel members may form a second row of channel members detachably mounted via latch assemblies to receiver assemblies fixedly mounted to the inside of the side boards at spaced longitudinal positions along the bottom board of the ladder from corresponding to receiver assemblies of the top board, which second row receiver assemblies are inverted with respect to those of the first row. The lower row of U-shaped channel members open upwardly such that the channel members of both rows form four corner slides for a plurality of rectangular upwardly open drawers inserted through the openings of the ladder frame with these corners engaging the slides, thereby permitting the drawers to function as openable and closable storage containers for the knockdown bed.

The knockdown bed may include a platform base assembly comprising base assembly end boards and side boards joined along respective ends to form a vertical open rectangular base platform. The bed end boards and side boards are mounted, respectively, to the platform base assembly. The end boards and side boards and may act as extensions thereof. The end boards each have a channel member fixed to a facing side and extend horizontally the length thereof at a position above the top of the platform base assembly. Others of the plurality of U-shaped channel members are detachably mounted via the latch assemblies to the receiver assemblies on the bed side boards at positions above the top of the platform base member side boards. Each latch assembly provides an overcenter coupling function to couple to U-shaped channel members, at a given end to an opposed, abutting side board. Each coupling receiver assembly includes a U-shaped channel guide member sized and configured to fit into the interior of the channel member at its open end and is mounted to the face of the sideboard. A vertical platelike catch is mounted to the interior of the U-shaped guide member and terminates at its upper end in a C-shaped hook portion whose open side faces away from the channel member. The overcenter coupling is effected by a latch assembly which comprises an inverted U-shaped saddle member including a horizontal base, legs depending from the base at opposite sides thereof. The legs terminate in bosses which project outwardly of the legs to opposite sides of the saddle member. The bosses are received within holes of the U-shaped channel members for pivoting of the saddle member about the axis of the bosses. An integral finger projects upwardly from and at right angles to the base of the saddle member. A U-shaped wire latch bar is pivoted at its free ends to the base and projects outwardly from the base. It is pivotable between positions in line with the base and at generally right angles thereto and parallel to the finger. The U-shaped wire latch bar is of a length and the holes for rotatably mounting the bosses are positioned remote from the end of the channel member, such that the U-shaped wire latch bar may be positioned with its center engaging the C-shaped hook portion of the platelike catch with the finger at right angles to the U-shaped wire latch bar and parallel to the side board bearing the receiver assembly. With the finger deflected from raised vertical position to a generally horizontal position, the U-shaped wire latch bar pivots overcenter, i.e., across the pivot axis for the bosses, causing the end of the channel bar to abut the side board and capture the channel guide internally of the U-shaped channel member and being rigidly coupled thereto via the overcenter action of the coupling latch bar.

The invention, in another aspect, is directed to the overcenter coupling comprised of the receiver assembly and the latch assembly for mounting to a side board and channel member, or their equivalents.

DESCRIPTION OF THE PREFERRED EMBODIMENTS

Figure 1:
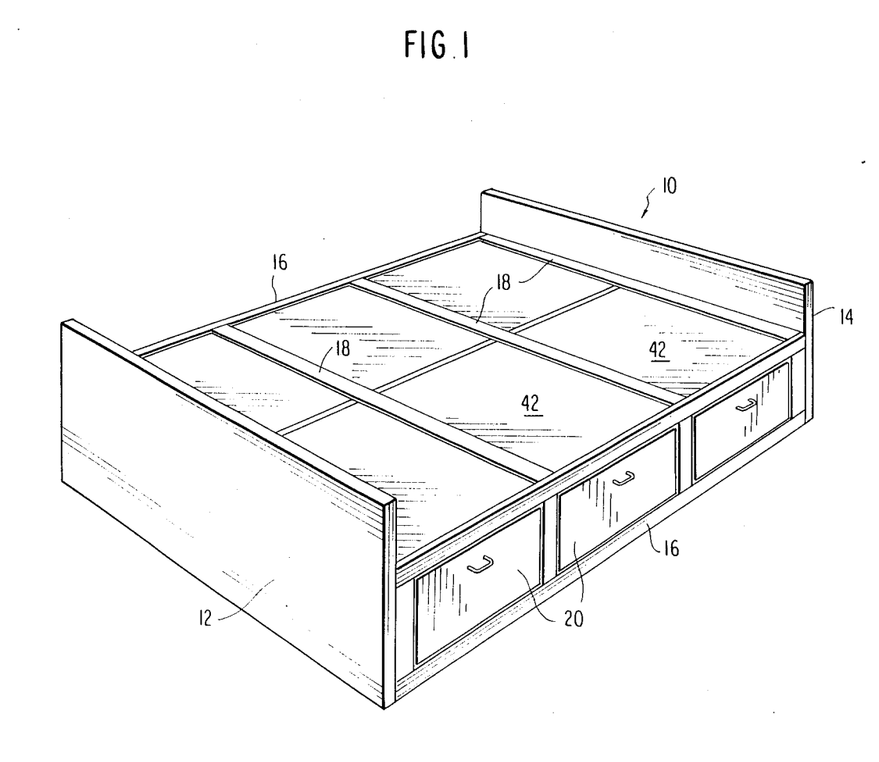
FIG. 1 is a perspective view of a knockdown storage bed forming one embodiment of the present invention.
Figure 2:
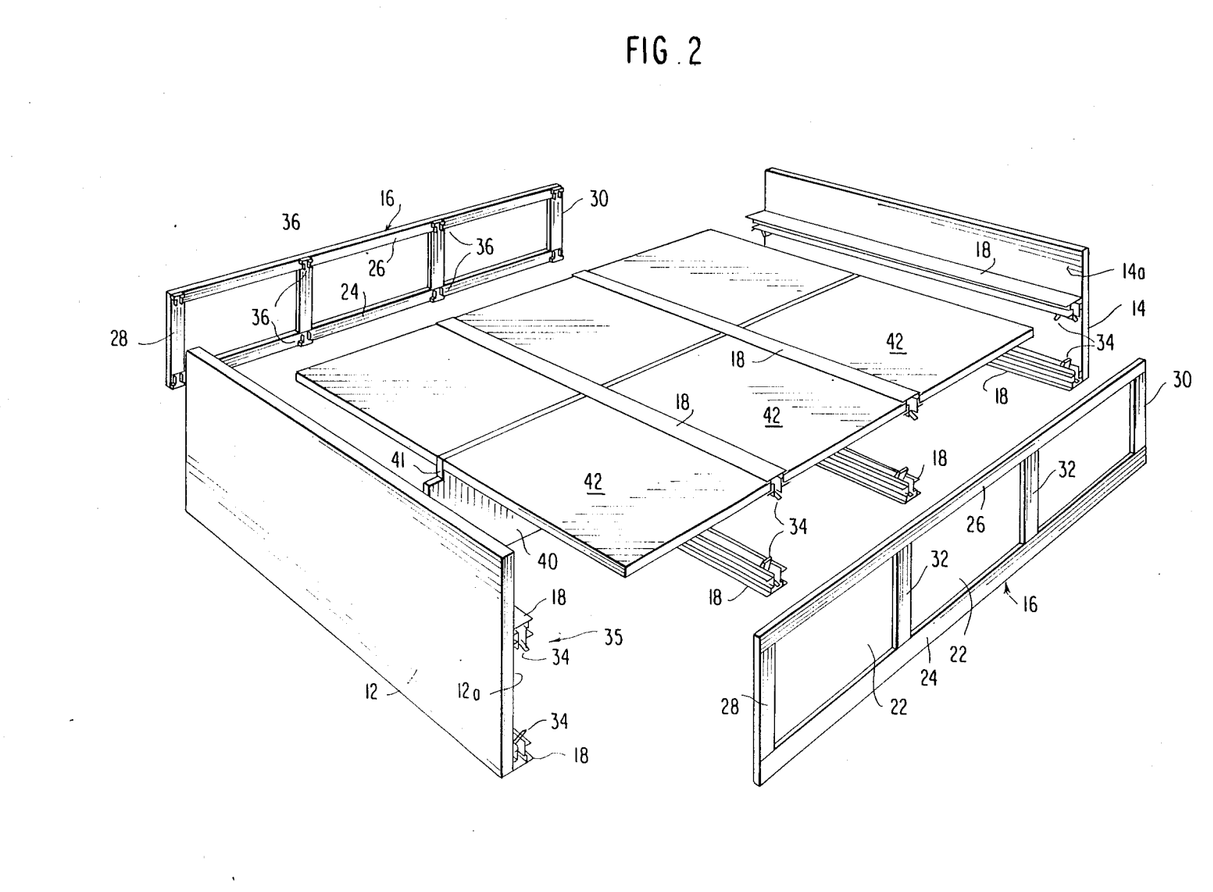
FIG. 2 is an exploded, perspective view of the bed of FIG. 1 and illustrating the components of the bed and the manner of bed assembly and disassembly.

Referring initially to FIGS. 1 and 2, it is seen that the knockdown bed forming a principal aspect of the present invention and indicated generally at 10 is what is termed in the art as a "storage bed". The bed 10 is comprised of a headboard 12, a footboard 14 (both of which may be termed "end boards"), a and pair of opposed, laterally spaced sideboards 16. The components 12, 14 and 16 are detachably coupled or connected together in knockdown fashion via a plurality of generally U-shaped channel members 18 which are detachably coupled at their ends to opposed sideboards 16 in a manner to be described hereinafter. In the embodiment shown, the sideboards 16 take the form of ladder frames, within which are slidably inserted suitably sized and configured rectangular drawers 20.

Referring particularly to FIG. 2, the sideboards 16 in the form of ladder frames are comprised of a narrow bottom board 24, a similarly sized narrow top board 26 and being separated but joined by vertical end risers 28 and 30, along with a pair of intermediate vertical risers 32. Members 24, 26, 28, 30 and 32 may be wooden as may the end boards for the bed 10, specifically headboard 12 and footboard 14. A further important aspect of the invention is the utilization of a number of overcenter couplings indicated generally at 35 and each consisting of an overcenter latch assembly indicated generally at 34 which mounted to respective ends of each of the U-shaped channel members 18, and receiver assembly 36 which are fixed to sideboards 16 and specifically in two rows along the top and bottom boards 26, 24, respectively, of the ladder frame type sideboards 16 in FIG. 2 at positions corresponding to the vertical risers.

Further, as will be seen hereinafter, it is important that at least one channel member 18 be mounted along its sides to the facing surfaces 12a, 14a of the headboard 12 and footboard 14, respectively, for both beds forming illustrated embodiments of the present invention. In the embodiment of FIGS. 1 and 2, a channel member 18 extends along the bottom edge of both the headboard 12 and footboard 14, and one at a vertically raised position thereto, on both the headboard and the footboard corresponding generally to the height of the top board 26 of each of the ladder frame type sideboards 16. The channel members 18 extending horizontally and parallel to each other, being sidemounted to the headboard 12 and footboard 14, with the upper U-shaped channel member 18 being inverted such that it opens downwardly while for the lower U-shaped channel member 18 opens upwardly.

As may be appreciated, the channel members 18 not only constitute the detachable elements for linking the end boards to the sideboards, but they additionally perform the function of slidably receiving hollow core panels 42 of rectangular plan configuration which are sized to channel member grooves or slots within opposed sides of the channel members 18. Thus, the assembly of the hollow core panels 42 and the channel members 18 form a rigid planar box spring and mattress support. Additionally, these channel members 18 define four corner slides for slidably receiving the corners of the rectangular drawers 20 to permit their easy entry and removal from openings 22 formed within the ladder frame type sideboards 16 to each side of bed 10.

Further, by reference to FIG. 2, it is seen that the bed is completed by a vertical spine panel 40 which is provided with suitable notches 41 along its length, both at the top and at the bottom, within which mount the channel members 18 to further facilitate the creation of a knockdown storage bed of high rigidity, while permitting the slidable mounting of six completely removable drawers 20 within the bed frame in the illustrated embodiment of FIGS. 1 and 2.

Figure 3:
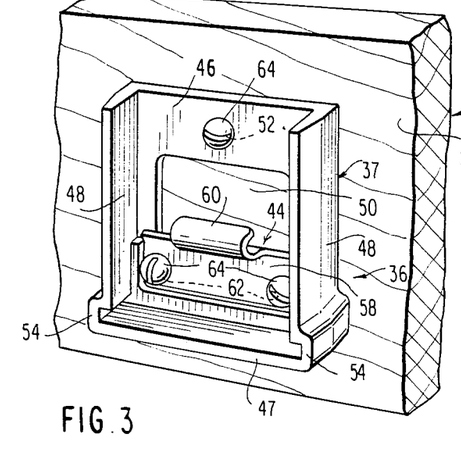
FIG. 3 is a perspective view of a receiver assembly employed in the bed of FIGS. 1 and 2 and forming one component of an overcenter coupling, which coupling forms a further aspect of the present invention.
Figure 4:
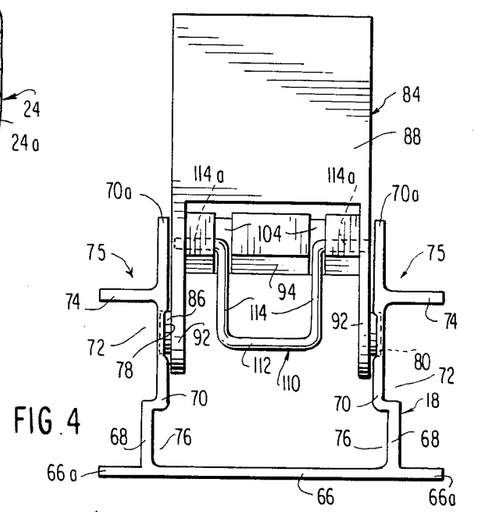
FIG. 4 is an end view of one of the U-shaped channel members employed in the construction of the bed of FIGS. 1 and 2 and illustrating the latch assembly forming the other component of the overcenter coupling.
Figure 5:
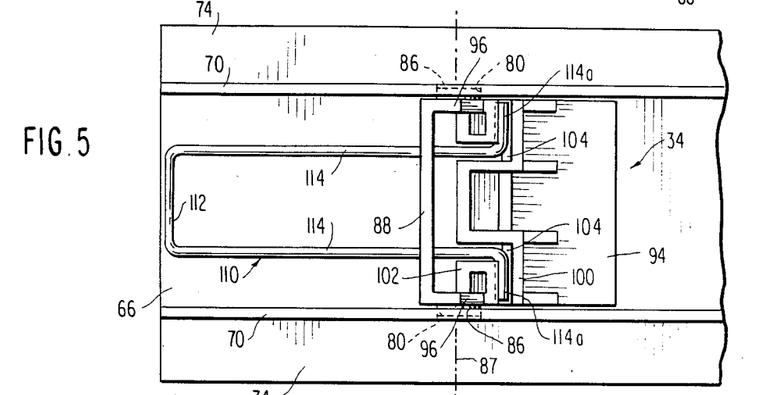
FIG. 5 is a top plan view of the latch assembly of the overcenter coupling.

Referring to FIGS. 3 through 7 inclusive, a better understanding and appreciation of the overcenter coupling for coupling of the channel member ends to the side panels of bed 10, may be appreciated. In FIG. 3, the bottom board 24 of the ladder frame type end panel 16 has mounted on its interior surface 24a, one of the receiver assemblies 36. Receiver assembly 36 is comprised of a plastic catch plate mount and channel member guide 37 which may be partially mounted by way of screw 64 projecting through hole 52 to face 24a of the side panel member 24. The catch plate mount and channel member guide 37 is of generally U-shaped plan configuration including a front wall 46, bearing hole 52, and extending vertically upward from a base 47 and being integrated with opposed vertical sidewalls 48. The plastic molded guide 37 has its sidewalls 48 terminating adjacent base 47 in laterally projecting offset portions 54 which, as seen in FIG. 4, are receivable within the corresponding offset recesses formed within the lightweight aluminum metal extrusion channel member 18. Further, the front wall 46 is provided with a rectangular hole 50 to insure access for a U-bar of the latch assembly 34. The catch plate, indicated generally at 44, is formed from a piece of sheet metal stock and includes a flat base portion 58 bearing paired holes 62. A further pair of screws 64 penetrate holes 62 and aligned holes (not shown) within the front wall 46 and bottom board 24, thereby facilitating both the mount of the catch plate 44 and the plastic catch plate mount and channel member guide 37 to board 24. The upper end of base plate 58 terminates in a C-shaped hook portion 60 whose hook opening faces opening 50 and the face 24a of sideboard member 24. The hook portion 60, while facing away from the channel member 18, is bent or curved outwardly away from the plane of the base 58 so as to provide a gap 61, FIG. 6, to permit the center of a latch bar 110 to pass over the hook portion 60 and to be retained thereby during coupling, as will be appreciated hereinafter.

The second element of each overcenter coupling 35 comprises the latch assembly 34. It is formed of two components, a saddle member indicated generally at 84, and pivotable latch bar, indicated generally at 110. The saddle member 84 is pivotably mounted to the U-shaped channel member 18. In that respect, the channel member 18, FIG. 4, comprises an aluminum or other similarly shaped material and is constituted integrally in cross-section, by a base 66 from which rises, near opposite ends, a pair of vertical walls 68. Walls 68 have laterally inward offset portions 70 which rise vertically upward therefrom and form recesses 76 to each side of the channel member 18, to the interior of the extrusion. Within the offset portions 70 of those walls, there is provided a very shallow groove as at 78 on each side of the channel member 18 which face each other and within which, at longitudinally spaced positions, are formed circular openings or holes 80. These holes 80 may extend at spaced longitudinal positions over the length of the channel members. The holes 80 proximate to the opposite ends of the channel members function to pivotably mount the saddle members 84 of respective latch assemblies 34. The lateral offsets 70 for each of the sidewalls 68 of the channel member 18 carry integral right angle outwardly directed flanges 74 which cooperate with flanges 66a as projections of the base 066 to define rectangular channels or grooves 72 to each side of the channel member 18. Grooves 72 receive edges of the hollow core panels 42 which are of a thickness generally equal to the distance spanning the insides of channel member flanges 66a, 74. Further, each of the flanges 74 define, with the terminal ends 70a of the sidewalls 68 of the channel members 18, drawer slides 75 for guiding the corners of the rectangular form drawers 22 which are inserted within each of the ladder frame type sideboards 16 of bed 10, onto the slides 75.

Figure 6:
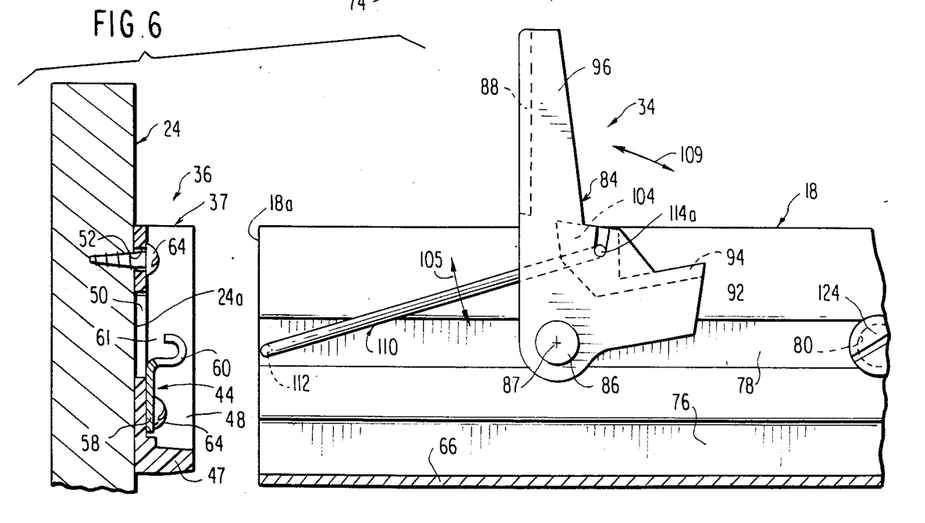
FIG. 6 is a longitudinal sectional view of a portion of one of the channel bars of the bed of FIGS. 1 and 2 showing the nature and operation of the overcenter coupling for effecting a rigid connection between the ends of the channel members and the side boards of the bed, prior to effecting the coupling.
Figure 7:
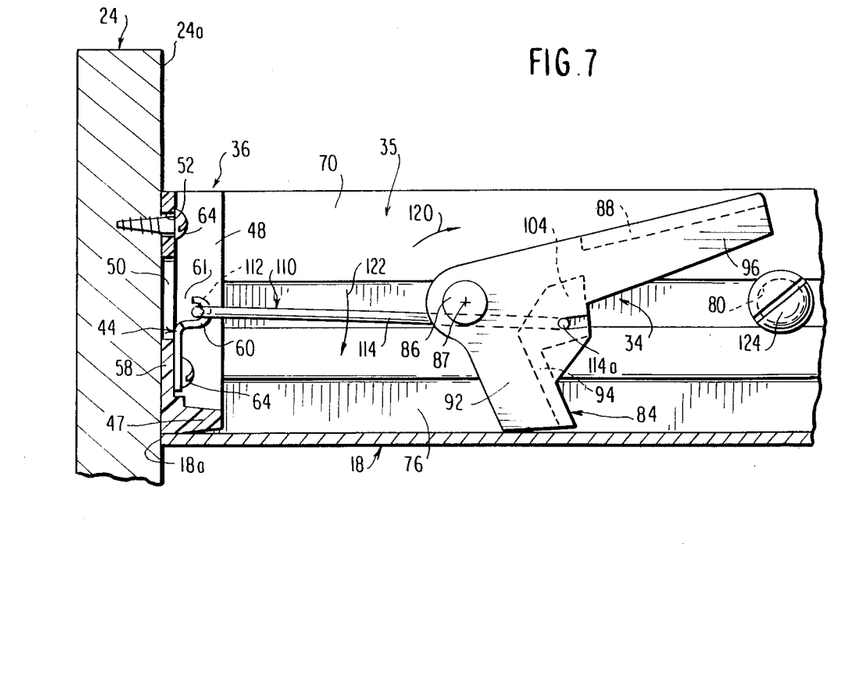
FIG. 7 is a similar vertical sectional view to that of FIG. 6, at the termination of coupling with the latch bar pivoted overcenter relative to the saddle member of the latch assembly.

As perhaps may be best seen in FIGS. 6 and 7, each saddle 84 is comprised of a flat base portion 94 from which depends a pair of legs 92 to each side thereof and which are integrated to a right angle finger 88 via laterally opposed sidewalls 96. Projecting outwardly of legs 92 of the saddle member 84 are a pair of short length, circular bosses 86 which have a diameter slightly less than the diameter of holes 80, receiving the bosses, within the channel member sidewall extension offset portions 70. The bosses 86 define a pivot axis 87 at their centers for the saddle members 84. The saddle member 84 may constitute a plastic molded element, and the base 94, in its integration to sidewalls 96, is provided with short height frame members 100, 102, FIG. 5, defining paired L-shaped slots 104 within which is positioned ends 114a of a metal wire latch bar 110 of generally U-shaped configuration whose arms 114 extend from a center portion 112. Center portion 112 is of a length somewhat in excess of the width of hook 60 of the catch plate 44. The length of the latch bar arms 114 is correlated to the position of terminal ends 114a of the latch bar arms 114 and the pivot axis of the saddle members 84 supporting the same such that with finger 88 in verticaly upright position, or tilted slightly towards sideboard member 24, the central portion 112 of the bar latch 110 passes freely over the hook 60, falls through the gap 61 between the hook 60 and face 24a of sideboard member 24, to be held by the catch plate 44. In this action, the saddle member 84 pivots counterclockwise as per arrow 109, FIG. 6, and the latch bar 110 moves towards the catch plate 44. In fact, the central portion 112 of the latch bar 110 may be extended beyond the end 18a of the channel member 18.

To effect connection of an end of a channel member 18 to a receiver asembly 37, mounted to the face of the sideboard 16, and to effect a rigid coupling between that end of the channel member 18 and the sideboard 16, during engagement of the latch bar 110 with catch plate 44, the U-shaped channel member end 18a moves onto and envelopes the plastic catch plate mount and channel member guide 37, during which, the offset projections 54 of the sidewalls 48 of guide 37 are received within recesses 76 at opposite sides of the channel member 18. This locates the end of channel member 18 relative to catch plate 44. The finger 88 of the latch assembly 34 saddle member 84 is then pivoted clockwise as evidenced by arrow 120, FIG. 7, to cause the saddle member 84 to pivot about its pivot axis 87, forcing the bar latch 110 to swing through an angle in a clockwise direction as shown by arrow 122 to a position such that the plane of the arms 114 latch bar 110 passes through the pivot axis 87 defined by bosses 86 of the saddle member 84, which resists uncoupling, due to the fact that any reverse movement tends to drive the latch bar backwards through the pivot axis 87 of the saddle member 84, which is highly resisted by the elements in their coupled state.

Further, as may be appreciated by reference to FIG. 7, a series of screws as at 124 pass through the additional circular holes 80 within one of the walls 68 of the channel member 18 such that two of the channel members 18 may be appropriately side mounted to the interior surface 12a of headboard 12 and 14a of footboard 14, respectively, of the knockdown bed 10, FIGS. 1 and 2, thereby facilitating bed assembly and disassembly in a manner of minutes.

It should also be noted that slots 104 extend vertically over an appreciable distance within saddle member 84 to permit a free swing of the latch bar 110 as indicated by double headed arrow 105, FIG. 6, to ensure the passage of the central portion 112 of the latch bar 110 over hook portion 60 of the catch plate 44.

As may be appreciated by reference to FIG. 7, in releasing the overcenter coupling 35, finger 88 of saddle member 84 is forced to move counterclockwise swinging latch bar 110 across the pivot axis 87 of the saddle member 84, at which point release occurs between the latch bar 110 and catch plate 44. This permits the extrusion channel member 18 to be moved away from the plastic catch plate mount and channel member guide 37, with the latch bar 110 freed from the catch plate hook portion 60 by simply lifting the central portion 112 of that member through gap 61 between the tip of the hook portion 60 and face 24a of the sideboard ladder frame member 24 (or its equivalent).

Figure 8:
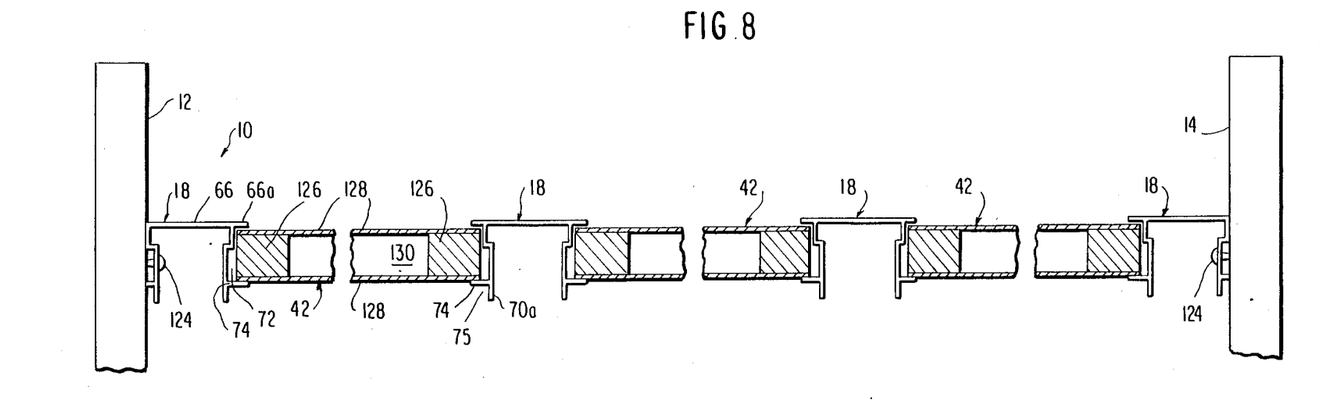
FIG. 8 is a longitudinal vertical sectional view of a portion of the bed of FIG. 1 showing the mounting of the hollow core panels to the extrusion channel members forming components thereof.

Referring next to FIG. 8, it is seen that sidewall offset portion 70 of certain of the channel members abut the headboard 12 and footboard 14, respectively. The nature and make up of the hollow core panels 42, their slidable mounting to and between adjacent channel members 18 and finally the nature in which the drawers 20 are fitted to and between upper and lower channel members 18 functioning as drawer guides, may be further seen. Specifically, each of the hollow core panels 42 is comprised of an outer framework of wood beams as at 126 sandwiched by outer sheets 128 of plywood or the like and being bonded thereto by means of adhesive at their contacting surfaces with the beams 126. This creates a hollow interior at 130, making the panels 42 lightweight but capable of supporting the load of the box spring and mattress and person or persons (all not shown) occupying the bed 10. Further, the creation of the slots or grooves 72 by the base projection 66a of each extrusion 18 and flanges 74, sized to the thickness of the panels 42 may be appreciated. Additionally, the terminal ends 70a of the offset portion 70 of the sidewalls of the extrusion channel members 18 combined with right angle flanges 74 define corner slides 75 for the slidably inserted and removed drawers 20. The multiple functions of the extrusion channel members 18 are integrated in a simplified and low cost manner, creating a rigid bed whose rigidity is maintained while at the same time facilitating storage of materials, ie. clothing and the like within the various openable drawers 20 beneath the hollow core panels 42.

Figure 9:
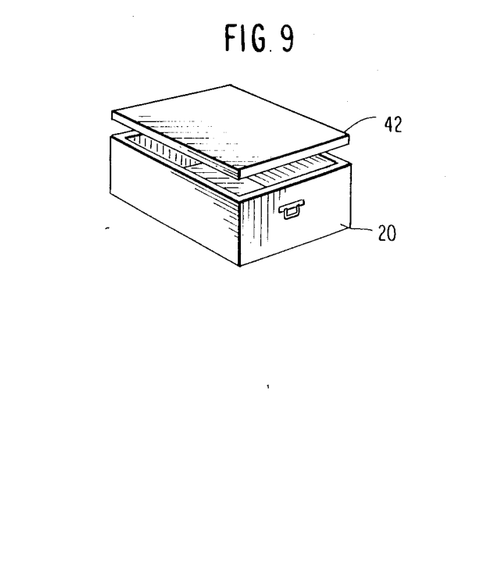
FIG. 9 is an exploded perspective view of one of the drawers of the bed of FIG. 1 with a hollow core panel being applied thereto as a cover therefor when the drawer and hollow core panel are separated from the bed subsequent to bed disasembly.

FIG. 9 shows one of the drawers 20 after removal from bed 10 or when the bed is disassembled, permitting a hollow core panel 42 to be locked on top of a given drawer to form a closed container; the hollow core panels 42 being sized and configured to that of the open drawer 20 to permit this action. The utility of the bed is therefore enhanced in the embodiment of FIG. 1.

Figure 10:
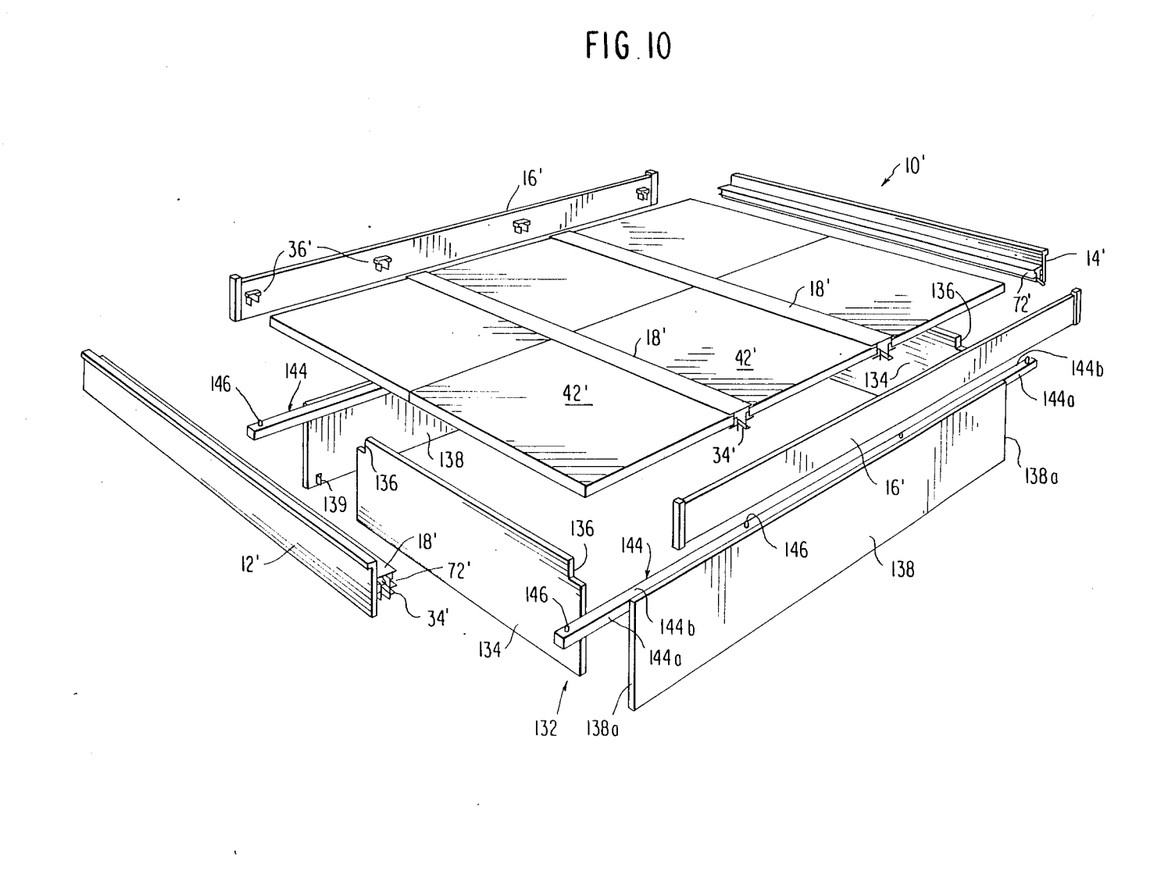
FIG. 10 is an exploded perspective view of a platform bed forming yet a further embodiment of the present invention.

Referring next to FIG. 10, a further embodiment of the present invention is illustrated in which the components of a "platform" bed, indicated generally at 10', have prime designations relative to the bed 10 of FIGS. 1 and 2. However, in this case, there are no removable drawers, nor are there upper and lower rows of receiver assemblies 36 mounted to opposite sides of the bed frame structure. In this embodiment, a platform base structure or assembly, indicated generally at 132, is comprised of platform base assembly end boards 134 which are identically sized and configured having rectangular notches 136 at both ends, at the top edges thereof, as well as laterally opposed platform base assembly sideboards 138. These boards are joined at their abutting side edges by releasable couplings (not shown). As typical in platform beds, the platform assembly 132 if of a shorter length and width than the box spring and matress (not shown) supported thereby.

In that respect, the platform base assembly 132 further includes wood beams 144 of square cross-section, of a length in excess of the length of sideboards 138, being rigidly connected to the inside of the platform base assembly sideboards, at the top, by way of suitable screws or the like (not shown), such that ends 144a of the beams project beyond the edges 138a of respective base assembly sideboards 138.

Mounted within the upper face of the beams 144 are a plurality of longitudinally spaced pins or dowels 146 at their ends, which are received within spaced vertical holes (not shown) within the bottom of the two outside channel members which mount the end boards 12', 14' vertically to the upper face 144b of beams 144, at ends 144a thereof. It should be noted that the cross-section of the beams 144 matches that of the rectangular notches 136 within end boards 134, receiving those beams. The basic framing for the platform bed 10' is completed by the utilization of bed sideboards 16'. In most respects, the platform bed 10' is very similar to that of the storage bed 10' in FIGS. 1 and 2. In this case, four channel members 18', identically configured and employed in the manner of the first embodiment, are employed in the platform bed 10'. In this case one of the channel members 18' is screwed or otherwise fixedly mounted to the inside surface of headboard 12' and the other to the inside surface of footboard 14' facing the head end of the bed. The channel members 18' incorporate at their ends, latch assemblies 34', while being fixedly mounted to the inside surface of sideboards 16' face each other. At the same level, are longitudinally spaced receiver assemblies indicated generally at 36' to the bed sideboards 16', two of the assemblies 36' being at the extreme ends of the sideboards 16' in the manner of the embodiment of FIGS. 1 and 2. Coupling is achieved in the identical manner to that of the first embodiment. In this case, as may be appreciated, all of the channel members 18' mount upside down such that they open face downwardly. The two interior channel members 18' engage, interiorly of their ends upstanding pins or dowels 146 of beams 144. Again, a number of hollow core panels 42' are slid into position so as to be received within slots 72' to one side or both sides of the channel members 18' depending upon whether the channel members 18' are at an interior position with respect to the endboards 12', 14' or abutting those endboards. The sideboards 16' connect to the ends of the channel members via latches 34' and receiver assemblies 36', respectively The connections permit the bed to be quickly assembled or knocked down within minutes or even seconds as appreciated from viewing the exploded perspective view of FIG. 10, to a similar degree as described in more detail with respect to the first embodiment and accomplished in similar fashion.

While the invention has been particularly shown and described with reference to preferred embodiments thereof, it will be understood by those skilled in the art that the foregoing changes in form and details and other changes may be made therein without departing from the spirit and scope of the invention.

What is claimed is:

1. A knockdown bed comprising:
opposed, longitudinally separated bed end boards,
laterally opposed bed sideboards,
a plurality of extruded U-shaped channel members at a length approximate the length of said end boards,
each of said U-shaped channel members fixedly mounting at opposite ends a detachable coupling latch assembly within said U-shaped channel members,
receiver assemblies sized and configured to fit within the ends of said U-shaped channel members fixedly mounted to at least the top of said sideboards at longitudinally spaced positions at uniform height from the bottom of the sideboards and forming at least one upper row of said receiver assemblies on each sideboard with said receiver assemblies of said rows being in diametrically opposite alignment, one of said channel members being fixed along one side thereof to the respective facing sides of each of said bed end boards, at a vertical height corresponding to the position of the receiver assemblies on the bed sideboards;

said latch assemblies at said channel members each including means for direct self-coupling to diametrically opposite receiver assemblies on opposed sideboards respectively, said channel members including means on each side thereof, defining open slots to each side thereof such that the open slots of adjacent channel members face each other, and thin rectangular panels slidably inserted within facing slots of said channel members;

whereby, said thin rectangular panels and said channel members form a planar box spring and mattress support across the top of the bed longitudinally from one end bed end board to the other and laterally from one bed sideboard to the other and define a relatively rigid bed frame.

2. The knockdown bed as claimed in claim 1, wherein said U-shaped channel members connected to the at least one row of receiver assemblies comprise a bottom wall, a pair of laterally spaced sidewalls extending perpendicular from the bottom wall, extensions of the channel member bottom wall forming a first flange, a second flange projecting laterally of each sidewall, in line with said first flange, parallel thereto and spaced therefrom to form said slots, said U-shaped channel members being inverted so as to open downwardly, whereby said channel member bottom walls are nearly flush with said panels.

3. The knockdown bed as claimed in claim 2, wherein said sideboards each comprise an open ladder frame of rectangular configuration including horizontal top and bottom board members joined together by longitudinally spaced, vertical risers forming rectangular openings therein, said receiver assemblies being fixedly mounted to the horizontal top and bottom board members of said open ladder frame at longitudinally spaced positions corresponding to said risers, said receiver assemblies forming upper and lower rows of oppositely facing receiver assemblies, and said U-shaped channel members comprising an upper row of channel members detachably coupled to said upper row of said receiver assemblies, and a lower row of channel members detachably coupled to said lower row of receiver assemblies, said U-shaped channel members coupled at their ends to said rows of receiver assemblies on the bottom board members of said open ladder frame sideboards opening upwardly, and said U-shaped channel members coupled at their ends to the receiver assemblies fixed to said horizontal top board members opening downwardly, respective U-shaped channel members defining top and bottom rows of channel members, vertically in line with each other, a plurality of rectangular drawers, and wherein each of said channel members includes means defining corner slides to each side thereof for contact with respective side edges of said rectangular drawers inserted through the openings of said ladder frame such that the side edges of said drawers in engaging said slides facilitate the opening and closing of said drawers, and rollers riveted to the sides of the bottom U-shaped channel members supporting the bottom edges of said drawers.

4. The knockdown bed as claimed in claim 3, wherein each of said receiver assemblies comprises a U-shaped channel member guide sized and configured to fit into the interior of the channel member at its open end in surface contact therewith and being mounted to the face of the sideboard, a vertical, platelike catch mounted to the interior of said U-shaped guide member and terminating at an upper end in a C-shaped hook portion having an open side facing away from said channel member, and wherein each latch assembly comprises an inverted U-shaped saddle member including a horizontal base, legs depending from said saddle member base at opposite sides thereof, said legs including cylindrical bosses projecting laterally outwardly of said legs to opposite sides of said saddle members, holes within said U-shaped channel members to opposite sides thereof receiving said bosses for pivot mounting of said saddle member about the axis of the bosses, an integral finger projecting upwardly from and generally at right angles to the base of said saddle member, a U-shaped wire latch bar pivotally mounted at its free ends to said saddle member base and projecting outwardly therefrom, and being pivotable from a position in line with said base to one generally at right angles thereto, parallel to said finger, and wherein said U-shaped wire latch bar is of a length and wherein the holes within each said channel member rotatably mounting said bosses are positioned such that said U-shaped wire latch bar may be moved into engaging contact with said C-shaped hook portion of said platelike catch and, by deflecting said finger from a raised vertical position to a generally horizontal, in line position, the U-shaped wire latch bar is pivoted overcenter, across the saddle member pivot axis defined by the bosses, causing the end of the channel member to abut the sideboard, to capture said channel member guide internally of said U-shaped channel member to establish a rigid coupling via the overcenter action of said coupling latch bar between the said channel member at its end and the face of the bed sideboard.

5. The knockdown bed as claimed in claim 4, wherein each of said channel member guides comprises a horizontal base, a pair of vertical sidewalls extending upwardly thereof, said sidewalls including integral laterally projecting portions at the base thereof, and wherein each said channel member comprises a metal extrusion including a horizontal base, a pair of laterally spaced vertical sidewalls, said sidewalls including laterally inward offset portions remote from said base and forming internal recesses facing each other, said recesses being sized to the projections of said channel member guide of said receiver assembly to maximize the rigidity of the coupling when effected by said U-shaped wire latch bar coupled at its center to said platelike catch C-shaped hook portion.

6. The knockdown bed as claimed in claim 1, further comprising a platform base assembly, said platform base assembly comprising longitudinally opposed platform base assembly end boards and laterally opposed base assembly sideboards, said platform base assembly end boards and said platform base assembly sideboards being joined along respective ends to form a vertical, upwardly open rectangular base platform, means for mounting said bed sideboards respectively to said platform base assembly to the outside of said platform base assembly sideboards via said channel members which extend across the tops of respective platform base assembly sideboards.

7. The knockdown bed as claimed in claim 6, wherein said platform base assembly end boards include rectangular notches at respective ends thereof and within upper edges thereof, said rectangular base assembly further comprises beams of a length in excess of the length of the base assembly sideboards, said beams being mechanically fixed to respective base assembly sideboards, extending parallel to and adjacent the upper edges of said base assembly sideboards, and having end portions extending beyond the ends of said base assembly sideboards, said beams being received within said rectangular notches within the base assembly end boards, and wherein said channel members extend across said beams on the upper faces thereof and are detachably connected to said beams.

8. An overcenter latch coupling for effecting a detachable coupling between a U-shaped channel member, at its end to an abutting end board extending transversely across the end of said U-shaped channel member, said overcenter latch coupling comprising:
   a receiver assembly for fixedly mounting to said board,
   an overcenter latch assembly carried by said U-shaped channel member at the end thereof,
   said receiver assembly comprising a U-shaped channel member guide sized and configured to fit into the interior of said U-shaped channel member at its open end in surface contact therewith,
   a vertical platelike catch mounted to the interior of said U-shaped guide member and terminating at an upper end in a C-shaped hook portion facing away from the engageable channel member,
   each overcenter latch assembly comprising an inverted U-shaped saddle member including a horizontal base,
   legs depending from said saddle member base at opposite sides thereof,
   said legs including cylindrical bosses projecting laterally outwardly of said legs to opposite sides of said saddle member for mounting within said U-shaped channel member to effect pivoting of said saddle member about the axis of said bosses,
   an integral finger projecting upwardly from and generally at right angles to the base of said saddle member,
   a U-shaped wire latch bar pivotably mounted at its free ends to said saddle member base and projecting outwardly therefrom, and being pivotable from a position in line with said base to one generally at right angles thereto, parallel to said finger, and
   wherein said U-shaped wire latch bar is of a length such that with said bosses rotatably mounting said saddle member, said U-shaped wire latch bar may be moved into engaging contact with said C-shaped hook portion of said platelike catch;
   whereby, deflecting of said finger from a raised vertical position to a generally horizontal in line position, said U-shaped wire latch bar is pivoted overcenter across said saddle member pivot axis defined by said bosses, causing the end of said channel member to abut the board to capture said channel member guide internally of said U-shaped channel member and to thereby establish a rigid coupling via the overcenter action of said coupling latch bar between said channel member at its end and the face of the board.

9. The overcenter coupling as claimed in claim 8, wherein said channel member guide comprises a horizontal base, a pair of vertical sidewalls extending upwardly thereof, said sidewalls including integral laterally projecting portions at the base thereof, and wherein the channel member pivotably supporting the latch saddle member comprises a metal extrusion including a horizontal base, a pair of laterally spaced vertical sidewalls, said sidewalls including laterally inward offset portions remote from said base and forming internal recesses facing each other, said recesses being sized to receive the projections of the channel member guide of the receive assembly to maximize the rigidity of the coupling when effected by said U-shaped wire latch bar coupled at its center to said platelike catch C-shaped hook portion.

* * * * *